US012079374B2

(12) United States Patent
Bowie et al.

(10) Patent No.: US 12,079,374 B2
(45) Date of Patent: Sep. 3, 2024

(54) SECURE SOFTWARE COMPILATION AND SOFTWARE VERIFICATION

(71) Applicant: International Business Machines Corporation, Armonk, NY (US)

(72) Inventors: Dale Bowie, Benowa (AU); Narayana Aditya Madineni, Southport (AU); Matthew Green, Ashmore (AU)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 17/457,037

(22) Filed: Dec. 1, 2021

(65) Prior Publication Data

US 2023/0169215 A1 Jun. 1, 2023

(51) Int. Cl.
*G06F 21/64* (2013.01)
*G06F 8/10* (2018.01)
*G06F 8/41* (2018.01)
*G06F 21/33* (2013.01)
*G06F 21/60* (2013.01)

(52) U.S. Cl.
CPC .............. *G06F 21/64* (2013.01); *G06F 8/10* (2013.01); *G06F 8/41* (2013.01); *G06F 21/33* (2013.01); *G06F 21/602* (2013.01)

(58) Field of Classification Search
CPC ... G06F 21/64; G06F 8/10; G06F 8/41; G06F 21/33; G06F 21/602
See application file for complete search history.

(56) References Cited

U.S. PATENT DOCUMENTS

| | | | |
|---|---|---|---|
| 5,692,047 A * | 11/1997 | McManis | G06F 21/52 |
| | | | 717/126 |
| 7,966,602 B1 * | 6/2011 | Webster | G06F 8/423 |
| | | | 717/114 |
| 8,200,983 B1 | 6/2012 | Mctorov | |
| 8,943,482 B2 * | 1/2015 | Andrade | G06F 8/30 |
| | | | 717/154 |
| 9,792,114 B1 * | 10/2017 | Schaefer | G06F 8/75 |
| 9,904,614 B2 | 2/2018 | Stevens | |
| 10,656,936 B2 * | 5/2020 | Robison | G06F 9/44589 |
| 2004/0083366 A1 | 4/2004 | Nachenberg | |
| 2009/0049430 A1 * | 2/2009 | Pai | G06F 9/44589 |
| | | | 717/140 |
| 2012/0096516 A1 | 4/2012 | Sobel | |
| 2013/0019231 A1 | 1/2013 | Mangard | |

(Continued)

FOREIGN PATENT DOCUMENTS

CN 112528342 A 3/2021

OTHER PUBLICATIONS

"About Commit Signature Verification", Github Docs, Published Oct. 21, 2021, Retrieved using Internet Archive (Year: 2021).*

(Continued)

*Primary Examiner* — Shin-Hon (Eric) Chen
*Assistant Examiner* — Ethan V Vo
(74) *Attorney, Agent, or Firm* — Yee & Associates, P.C.

(57) ABSTRACT

Before deployment, artifacts and/or binaries are generated by the process of compilation from source code files are double signed with signatures. Immediately before deployment, a copy of the artifacts and/or binaries is made for the planned deployment and the double signed signatures are checked to ensure source code integrity and security.

20 Claims, 4 Drawing Sheets

(56) References Cited

U.S. PATENT DOCUMENTS

| | | | | |
|---|---|---|---|---|
| 2015/0363576 | A1* | 12/2015 | Medvinsky | H04L 9/3247 726/26 |
| 2017/0048215 | A1 | 2/2017 | Straub | |
| 2017/0147306 | A1 | 5/2017 | Weber | |
| 2017/0149568 | A1* | 5/2017 | LaGrone | G06F 12/1408 |
| 2018/0007059 | A1 | 1/2018 | Innes | |
| 2018/0307480 | A1* | 10/2018 | Doyle | G06F 8/658 |
| 2019/0205121 | A1* | 7/2019 | Ericson | H04L 9/3247 |
| 2019/0272162 | A1* | 9/2019 | Couillard | G06F 21/125 |
| 2021/0216636 | A1* | 7/2021 | Devries | G06F 8/65 |
| 2021/0294921 | A1* | 9/2021 | Jäger | H04L 9/3247 |
| 2022/0244932 | A1* | 8/2022 | Lapiduz | G06F 21/64 |

OTHER PUBLICATIONS

"Patent Cooperation Treaty PCT Notification of Transmittal of the International Search Report and the Written Opinion of the International Searching Authority, or the Declaration", Applicant's file reference P202101206, International Application No. PCT/IB2022/061024, International filing date Nov. 16, 2022, Date of mailing Mar. 10, 2023, 9 Pgs.

"Analyzing Solorigate, the Compromised DLL File that Started a Sophisticated Cyberattack, and How Microsoft Defender Helps Protect Customers", Microsoft Security, Microsoft 365 Defender Research Team, Microsoft Threat Intelligence Center (MSTIC), Dec. 18, 2020, 33 pgs., <https://www.microsoft.com/security/blog/2020/12/18/analyzing-solorigate-the-compromised-dll-file-that-started-a-sophisticated-cyberattack-and-how-microsoft-defender-helps-protect/>.

"Defending Against Software Supply Chain Attacks", National Institute of Standards and Technology, U.S. Department of Commerce, Cybersecurity and Infrastructure Security Agency, Apr. 2021, 16 pgs.

"Reproducible Builds", Downloaded from the Internet on Jul. 28, 2021, 2 pgs., <https://reproducible-builds.org/>.

"Signing Commits", GitHub Docs, Downloaded from the Internet on Jul. 28, 2021, © 2021 GitHub, Inc., 3 pgs., <https://docs.github.com/en/github/authenticating-to-github/signing-commits>.

"Sunspot: An Implant in the Build Process", CrowdStrike Blog, CrowdStrike Intelligence Team, Research and Threat Intel, Jan. 11, 2021, 19 pgs., <https://www.crowdstrike.com/blog/sunspot-malware-technical-analysis/>.

"Supply Chain Compromise: Compromise Software Supply Chain", Mitre Att&Ck, Oct. 27, 2020, 2 pgs., <https://attack.mitre.org/versions/v8/techniques/T1195/002/>.

Arampatzis, A., "Linux Foundation Launches Sigstore to Combat Open-Source Supply Chain Attacks", Venafi, Apr. 12, 2021, 8 pgs., <https://www.venafi.com/blog/linux-foundation-launches-sigstore-combat-open-source-supply-chain-attacks>.

Harrison, G., "Signing and Securing Your Source Code on the Blockchain", Proven DB, May 30, 2019, 13 pgs., <https://medium.com/provendb/signing-and-securing-your-source-code-on-the-blockchain-964f347d38ff>.

* cited by examiner

SECURE SOFTWARE COMPILATION AND SOFTWARE VERIFICATION

BACKGROUND

The present invention relates generally to the field of software compilation, and also to software verification.

The Wikipedia entry for "Compiler" (as of Jul. 28, 2021) states, in part, as follows: "In computing, a compiler is a computer program that translates computer code written in one programming language (the source language) into another language (the target language). The name "compiler" is primarily used for programs that translate source code from a high-level programming language to a lower level language (e.g., assembly language, object code, or machine code) to create an executable program. There are many different types of compilers which produce output in different useful forms. A compiler that can run on a computer whose CPU or operating system is different from the one on which the code it produces will run is called a cross-compiler. A bootstrap compiler is written in the language that it intends to compile. A program that translates from a low-level language to a higher level one is a decompiler. A program that translates between high-level languages is usually called a source-to-source compiler or transcompiler. A language rewriter is usually a program that translates the form of expressions without a change of language. The term compiler-compiler refers to tools used to create parsers that perform syntax analysis. A compiler is likely to perform many or all of the following operations: preprocessing, lexical analysis, parsing, semantic analysis (syntax-directed translation), conversion of input programs to an intermediate representation, code optimization and code generation. Compilers implement these operations in phases that promote efficient design and correct transformations of source input to target output. Program faults caused by incorrect compiler behavior can be very difficult to track down and work around; therefore, compiler implementers invest significant effort to ensure compiler correctness. Compilers are not the only language processor used to transform source programs. An interpreter is computer software that transforms and then executes the indicated operations. The translation process influences the design of computer languages, which leads to a preference of compilation or interpretation. In theory, a programming language can have both a compiler and an interpreter. In practice, programming languages tend to be associated with just one (a compiler or an interpreter)." (footnote(s) omitted)

The Wikipedia entry for "Software Verification" (as of Jul. 28, 2021) states, in part, as follows: "Software verification is a discipline of software engineering whose goal is to assure that software fully satisfies all the expected requirements. Broad scope and classification[.] A broad definition of verification makes it equivalent to software testing. In that case, there are two fundamental approaches to verification: Dynamic verification, also known as experimentation, dynamic testing or, simply testing—This is good for finding faults (software bugs). Static verification, also known as analysis or, static testing—This is useful for proving the correctness of a program. Although it may result in false positives when there are one or more conflicts between the process a software really does and what the static verification assumes it does."

SUMMARY

According to an aspect of the present invention, there is a method, computer program product and/or system, for use with a compiler and a source file that includes source code, that performs the following operations (not necessarily in the following order): (i) signing the source file; (ii) edit the source file by commits; (iii) responsive to the editing of the source file by commits, updating a plurality of signatures associated with the source file; (iv) receive a request to compile at least a portion of the source code; and (v) responsive to the receipt of the request: (a) verifying the plurality of signatures, and (b) compiling the at least a portion of the source code with double signing of binaries and artifacts with the plurality of signatures.

DETAILED DESCRIPTION

Figure 1:
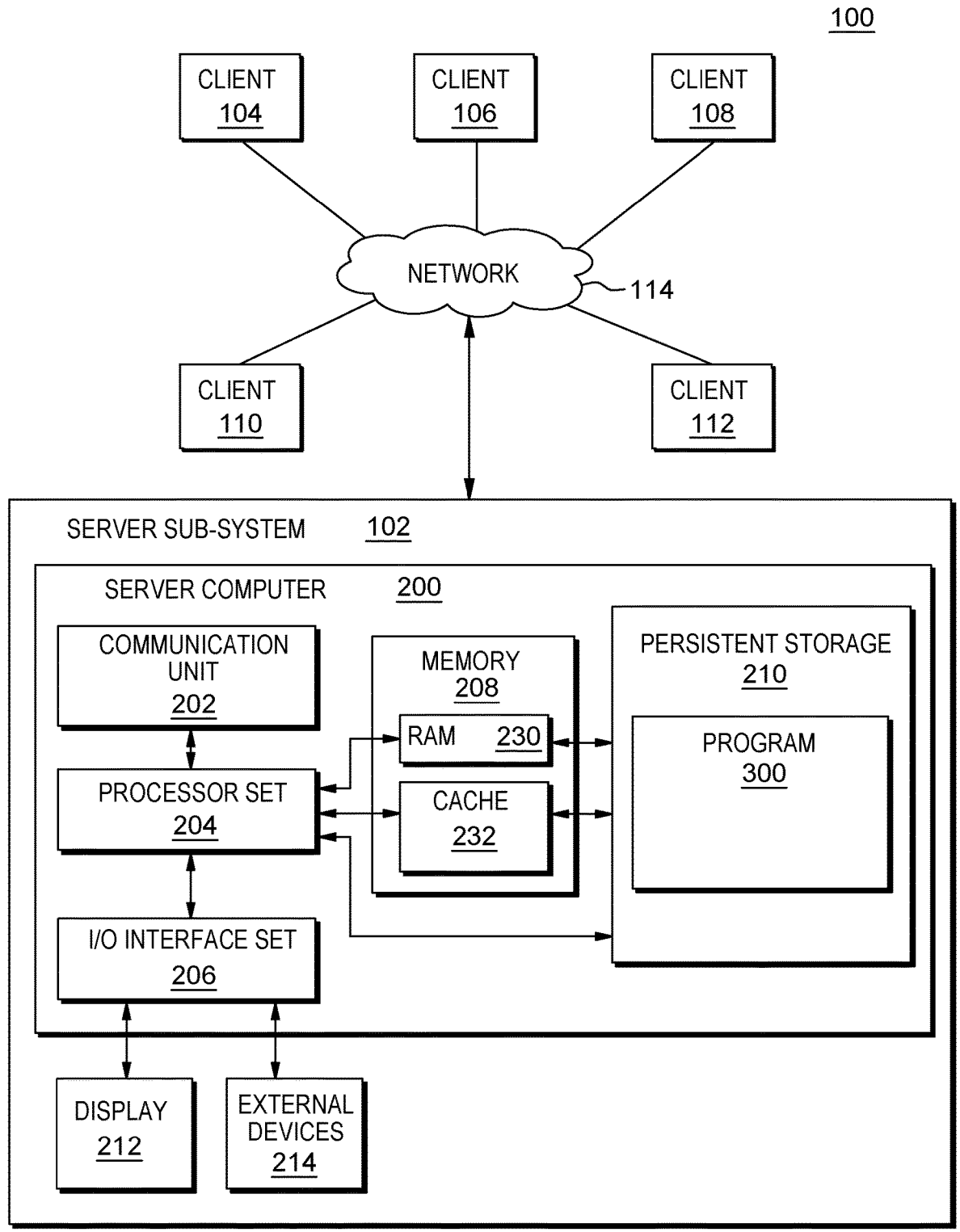
FIG. 1 is a block diagram view of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
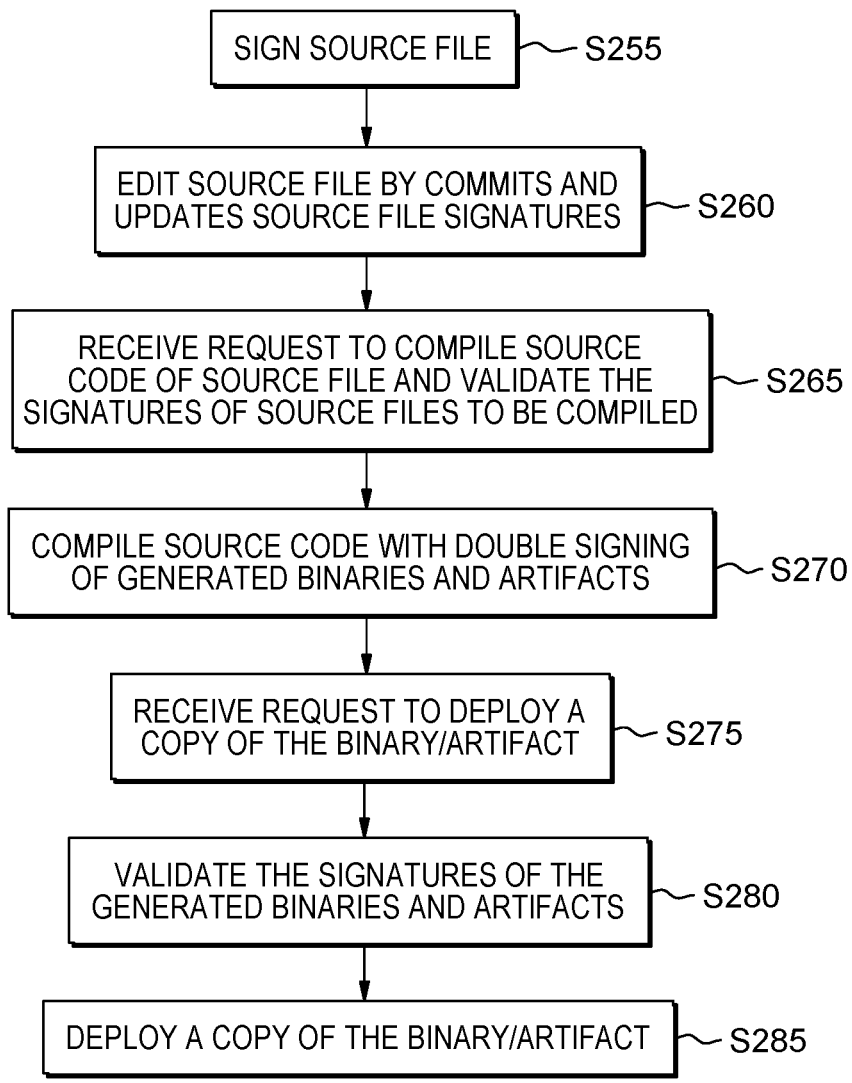
FIG. 2 is a flowchart showing a first embodiment method performed, at least in part, by the first embodiment system.
Figure 3:
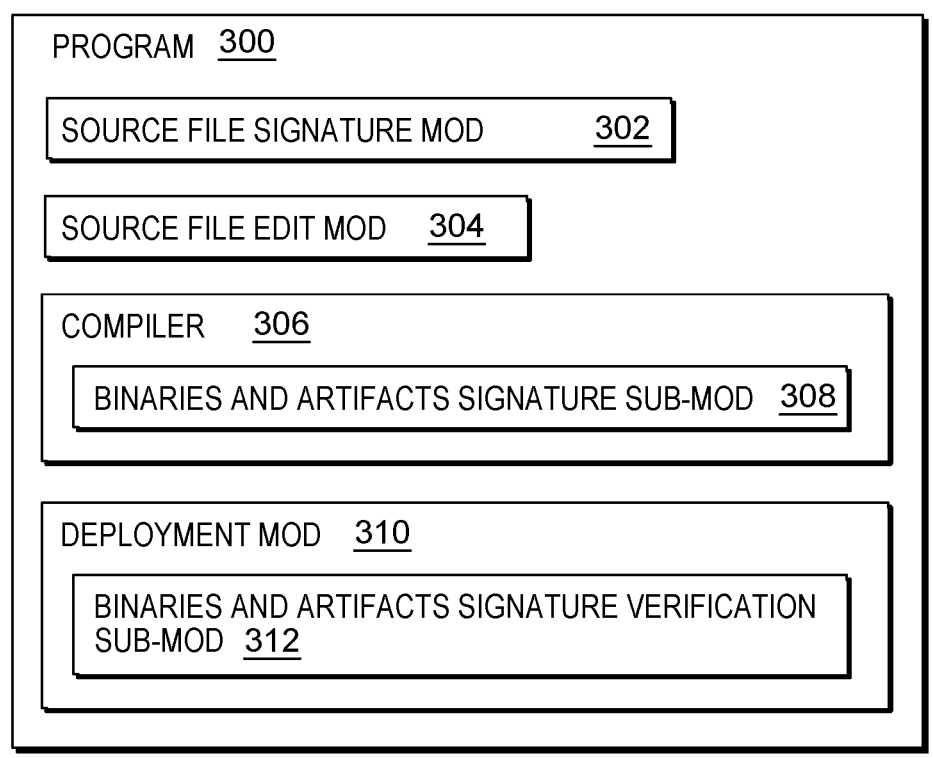
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where source file signature module ("mod") 302 signs a source file that includes source code. Processing proceeds to operation S260, where source file edit mod 304 edits the source file by commits. This editing causes generation of updated signatures associated with the source file. Processing proceeds to operation S265, where compiler 306 receives a request to compile at least a portion of the source code and validates the signatures of source files to be compiled. Responsive to the successful validation of signatures of the source files, processing proceeds to S270, where binaries and artifacts signature sub-mod 308 double signs the binaries and artifacts. Processing proceeds to operation S275, where deployment mod 310 receives a request to deploy a copy of the binaries and the artifacts. Processing proceeds to operation S280, where binaries and artifacts signature verification sub-mod 312 validates the double signed signatures of the binaries and artifacts made for the deployment to help determine that the source file is secure. Processing proceeds to operation S285, where, responsive to the validation of the plurality of signatures, mod 310 deploys the copy of the binaries and artifacts to client sub-system 104 where the copy can be used, relatively confident with respect to security and integrity concerns.

In some embodiments of the present invention: (i) a modified compiler that only compiles signed source code with a cryptographic relationship to signing that will be performed on the output binaries to thereby reduce the need for scaling and to provide a strong cryptographic assurance; and/or (ii) signing is extended to source code files that are retrieved from the source code management system and provide output artifacts with a signature of the compiler.

III. Further Comments and/or Embodiments

Some embodiments of the present invention recognize the following facts, potential problems and/or potential areas for improvement with respect to the current state of the art: (i) further methods of reducing the attack surface for a supply chain attack are needed; and/or (ii) there is a need for methods for a vendor to detect attack indicators before shipping the software to their customers.

Some embodiments of the present invention may include one, or more, of the following operations, features, characteristics and/or advantages: (i) uses a modified compiler that only compiles signed source code with a cryptographic relationship to the signing that will be performed on the output binaries; (ii) reduces the need for scaling; (iii) provides a strong cryptographic assurance; (iv) extends signing of the source code files that are retrieved from the source code management system; (v) outputs an artifact with a signature of the compiler used; and/or (vi) the above mentioned enhancements combined allow greater external verification, including that by the resultant software's customers after distribution.

Some embodiments of the present invention may include one, or more, of the following operations, features, characteristics and/or advantages: (i) utilizes a certificate chain and a modified compiler such that: (a) one can verify that the source code that was used by the compiler is trusted, and/or (b) that the compiler itself is trusted; (ii) the process can be performed external to the build engine; (iii) treats each source file as individual signed entities and uses that within a compiler to provide assurance that the compiled artifact is a true and accurate representation of the source; (iv) focuses more on the path of the code after being committed to a source code management system; and/or (v) the cryptographic relationship between the checked out code and the final deliverables is an embodiment of the present invention.

A method according to an embodiment of the present invention includes the following operations (not necessarily in the following order): (i) protects against supply chain attacks using PKI (public key infrastructure) where a keychain is used; (ii) signs source files to prevent from tampering using a private key only available to source management systems; (iii) validates the source file signatures by a compiler during compilation; (iv) reports an alert in case of a failed verification; (v) double signs the binaries/executables by the compiler using a vendor compilation key; and (vi) uses a pre-built key that comes with the compiler to ensure the compiler is trusted.

Some embodiments of the present invention may include one, or more, of the following operations, features, characteristics and/or advantages: (i) protects against tampering of source code in build systems by using a modified compiler; (ii) in the system, every source file is signed using a vendor source code signing key; (iii) signatures are updated when files are edited through commits; (iv) the compiler verifies that the source code is not tampered by validating signatures during the compilation of source code; (v) the compiler double signs the generated binaries/artifacts using a vendor compilation signing key and an inbuilt compiler key; and/or (vi) before deploying the software, the system validates the signatures of the binaries.

Some embodiments of the present invention may include one, or more, of the following operations, features, characteristics and/or advantages: (i) allows third-party verification of both the trusted compiler and the artifacts themselves as coming from trusted source code; (ii) distributes security to multiple disjoint systems such that all would need to be compromised for a successful attack; (iii) can be used by large companies that produce software for thousands of customers worldwide including large organizations and government departments; (iv) provides protection against any malicious compromise of the software that could be detrimental to the customers and the company's reputation; and/or (v) includes security practices to strengthen the products against supply chain attacks.

Some embodiments of the present invention may include one, or more, of the following operations, features, characteristics and/or advantages pertaining to vendor protection: (i) a key chain is used to sign the source code and the resultant artifacts; and/or (ii) the setup of the chain would follow the below approach where each element of the chain is signed by the preceding element in the chain: (a) root—globally trusted authority, (b) intermediate—begin of "n" series of intermediate layers, (c) intermediate—end of "n" series of intermediate layers, (d) vendor source code key—used to sign source code that is downloaded from the source code management system where the private key for this is only available in the source code management system and would sign the source code as close to the initial commit/push on the server side as possible, and/or (e) vendor compilation key—used to sign compiled artifacts where this is the only private key that is distributed on the build engine for access by the compiler.

Some embodiments of the present invention may include one, or more, of the following operations, features, characteristics and/or advantages pertaining to compiler modifications: (i) the compiler is pre-built with a compiler private key where it will be used for signing output artifacts; (ii) the compiler's public key is well known for verification purposes; (iii) the compiler is configured with access to the vendor compilation key, which was signed by the vendor source code key; (iv) the compiler is modified to only accept source files that have been signed by the same vendor source code key; (v) an artifact output by the compiler is then signed by both the vendor compilation key as well as the compiler key; and/or (vi) the double signing process allows one to verify: (a) the artifact was produced by a trusted compiler that had not been modified itself, and/or (b) the artifact was signed with a key derived from only signed source code files that have not been tampered with.

According to embodiments of the present invention, malicious inserted code detection in a build machine will now be discussed. Let's consider a situation where a malware such as Sunspot tries to replace a legitimate source code with a malicious source code. When the compiler tries to build the source file, it first performs a verification of signature using a vendor source code public key. For the malicious source code file, this check fails, and the compiler flags an alert and stops the build. Additionally, if the compiler on the build engine was compromised to remove the above check, verification of the signatures on the output binaries (or even the lack of signatures) would identify that the output was not produced in a secure and trusted environment.

Figure 4:
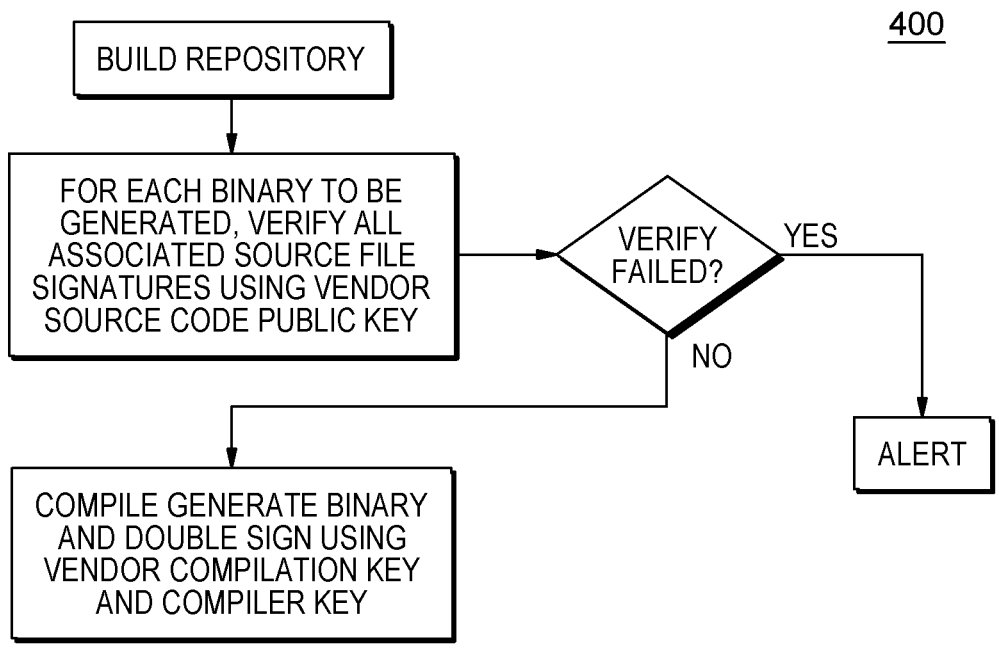
FIG. 4 is a first flowchart showing a second embodiment of a method according to the present invention.

As shown in FIG. 4, Build/CI (continuous integration) system with modified compiler flowchart 400 includes: build repository block; for each binary to be generated, verify all associated source file signatures using vendor source code public key block; verify failed (Yes/No) decision block; compile generate binary and double sign using vendor compilation key and compiler key block; and alert block. Flowchart 400 of FIG. 4 is helpful in understanding embodiments of the present invention.

Figure 5:
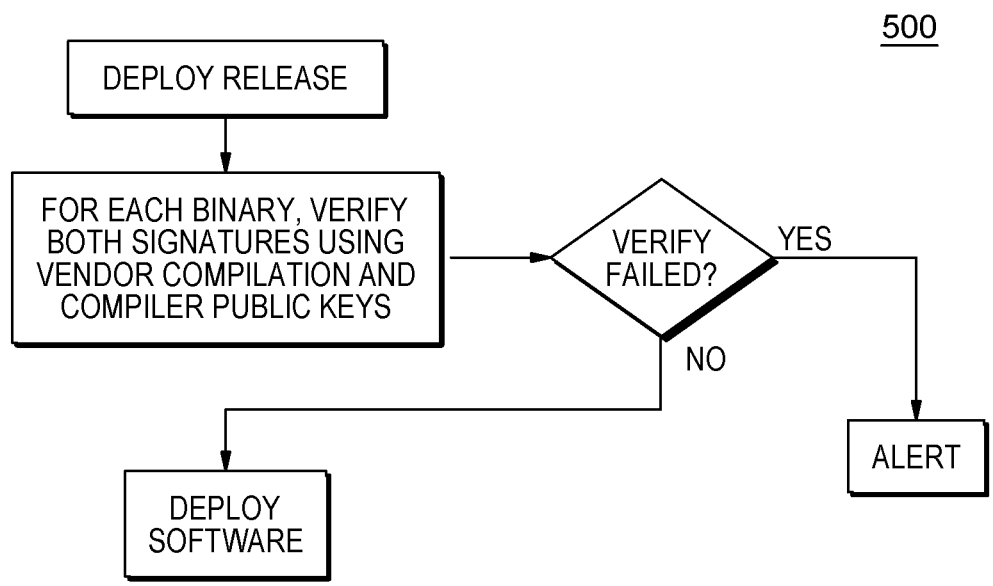
FIG. 5 is a second flowchart showing a second embodiment of a method according to the present invention.

As shown in FIG. 5, Deploy Software (CD (continuous delivery)) flowchart 500 includes: deploy release block; for each binary, verify both signatures using vendor compilation and compiler public keys block; verify failed (Yes/No) decision block; deploy software block; and alert block. Flowchart 500 of FIG. 5 is helpful in understanding embodiments of the present invention.

Some embodiments of the present invention may include one, or more, of the following operations, features, characteristics and/or advantages: (i) signs source files using private key accessible to the source code management system; (ii) provides verification of signatures by the compiler during compilation; (iii) includes double signing of binaries by the compiler to ensure the compiler is trusted; (iv) focusses on signing source code by a source code management system at the time of commit; (v) verifies signatures as a pre-requisite for compilation by the compiler; (vi) prevents tampering of the source code by ensuring the source code is signed by key accessible to the source code management system at the time of commit; (vii) signatures are validated by the compiler in build systems before performing compilation; (viii) the compiler also double signs artifacts to ensure a trusted compiler is used; (ix) focuses on signing of the source code at the time of commit by the key accessible to source code management; and/or (x) verifies the signature by the compiler before it compiles.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
creating, by a source code management system, an original version of a set of source code file(s), with the original version of the source code file(s) representing an original version of a computer program;
generating a first plurality of public key infrastructure (PKI) type cryptographic signatures by cryptographically signing, by the source code management system, the original version of the set of source files with a vendor source code signing key;
making a first edit, by the source code management system, to the original version of the set of source file(s) by a commit operation to obtain an edited version of the set of source file(s) representing an edited version of the computer program;
updating the first plurality of PKI type cryptographic signatures when the original version of the set of source code file(s) are edited through one or more commits;
receiving, by a compiler, a request to compile of the edited version of the set of source file(s); and
responsive to receipt of the request, verifying, by the compiler, the updated first plurality of PKI type cryptographic signatures; and
responsive to a successful verification of the first plurality of PKI type cryptographic signatures, generating binaries and artifacts by compiling, by the compiler, the edited version of the set of source file(s); and
generating a second plurality of PKI type cryptographic signatures by cryptographically signing, by the compiler, the binaries and artifacts with a vendor compilation signing key; and
generating a third plurality of PKI type cryptographic signatures by cryptographically signing, by the compiler, the binaries and artifacts with an inbuilt compiler key; and
receiving a request to deploy the generated binaries and artifacts; and
verifying both the second and third plurality of PKI type cryptographic signatures; and
responsive to a successful verification of both the second and third plurality of PKI type cryptographic signatures, deploying the generated binaries and artifacts.

2. The computer implemented method of claim 1, further comprising passing data between processors using a communications fabric.

3. The computer implemented method of claim 2, wherein the communications fabric is implemented, at least in-part, using one or more buses.

4. The computer implemented method of claim 1, further comprising passing control information between processors using a communications fabric.

5. The computer implemented method of claim 4, wherein the communications fabric is implemented, at least in-part, using one or more buses.

6. The computer implemented method of claim 2, further comprising passing both data and control information between processors using a communications fabric.

7. A computer program product (CPP) for use with a compiler and a source file that includes source code, the computer program product comprising:
- a computer readable storage medium comprising computer readable program instructions to cause a processor(s) set to perform at least the following operations:
- creating, by a source code management system, an original version of a set of source code file(s), with the original version of the source code file(s) representing an original version of a computer program;
- generating a first plurality of public key infrastructure (PKI) type cryptographic signatures by cryptographically signing, by the source code management system, the original version of the set of source files with a vendor source code signing key;
- making a first edit, by the source code management system, to the original version of the set of source file(s) by a commit operation to obtain an edited version of the set of source file(s) representing an edited version of the computer program;
- updating the first plurality of PKI type cryptographic signatures when the original version of the set of source code file(s) are edited through one or more commits;
- receiving, by a compiler, a request to compile of the edited version of the set of source file(s); and
- responsive to receipt of the request, verifying, by the compiler, the updated first plurality of PKI type cryptographic signatures; and
- responsive to a successful verification of the first plurality of PKI type cryptographic signatures, generating binaries and artifacts by compiling, by the compiler, the edited version of the set of source file(s); and
- generating a second plurality of PKI type cryptographic signatures by cryptographically signing, by the compiler, the binaries and artifacts with a vendor compilation signing key; and
- generating a third plurality of PKI type cryptographic signatures by cryptographically signing, by the compiler, the binaries and artifacts with an inbuilt compiler key; and
- receiving a request to deploy the generated binaries and artifacts; and
- verifying both the second and third plurality of PKI type cryptographic signatures; and
- responsive to a successful verification of both the second and third plurality of PKI type cryptographic signatures, deploying the generated binaries and artifacts.

8. The computer program product of claim 7, further comprising a processor set coupled to the computer readable storage medium.

9. The computer program product of claim 8, further comprising a memory coupled between the processor set and the computer readable storage medium.

10. The computer program product of claim 7, further comprising a communication unit coupled to the processor set.

11. The computer program product of claim 7, further comprising an I/O interface set coupled to the processor set.

12. The computer program product of claim 11, further comprising a display coupled to the I/O interface set.

13. The computer program product of claim 11, further comprising an input device coupled to the I/O interface set.

14. A computer system (CS) for use with a compiler and a source file that includes source code, the computer system comprising:
- a processor(s) set;
- a set of storage device(s); and
- computer code stored collectively in the set of storage device(s), with the computer code including data and instructions to cause the processor(s) set to perform at least the following operations:
- creating, by a source code management system, an original version of a set of source code file(s), with the original version of the source code file(s) representing an original version of a computer program;
- generating a first plurality of public key infrastructure (PKI) type cryptographic signatures by cryptographically signing, by the source code management system, the original version of the set of source files with a vendor source code signing key;
- making a first edit, by the source code management system, to the original version of the set of source file(s) by a commit operation to obtain an edited version of the set of source file(s) representing an edited version of the computer program;
- updating the first plurality of PKI type cryptographic signatures when the original version of the set of source code file(s) are edited through one or more commits;
- receiving, by a compiler, a request to compile of the edited version of the set of source file(s); and
- responsive to receipt of the request, verifying, by the compiler, the updated first plurality of PKI type cryptographic signatures; and
- responsive to a successful verification of the first plurality of PKI type cryptographic signatures, generating binaries and artifacts by compiling, by the compiler, the edited version of the set of source file(s); and
- generating a second plurality of PKI type cryptographic signatures by cryptographically signing, by the compiler, the binaries and artifacts with a vendor compilation signing key; and
- generating a third plurality of PKI type cryptographic signatures by cryptographically signing, by the compiler, the binaries and artifacts with an inbuilt compiler key; and
- receiving a request to deploy the generated binaries and artifacts; and
- verifying both the second and third plurality of PKI type cryptographic signatures; and
- responsive to a successful verification of both the second and third plurality of PKI type cryptographic signatures, deploying the generated binaries and artifacts.

15. The computer system of claim 14, further comprising a communication unit coupled to the processor(s) set.

16. The computer system of claim 14, further comprising an I/O interface set coupled to the processor(s) set.

17. The computer system of claim 16, further comprising a display coupled to the I/O interface set.

18. The computer system of claim 16, further comprising an input device coupled to the I/O interface set.

19. The computer system of claim 14, further comprising a server computer coupled to the processor(s) set.

20. The computer system of claim 19, further comprising a server sub-system coupled to the server computer.

* * * * *